US00RE50629E

(19) United States
(12) Reissued Patent
Chen et al.

(10) Patent Number: US RE50,629 E
(45) Date of Reissued Patent: *Oct. 14, 2025

(54) ARTIFICIAL NAIL TIP AND CURING COMPOSITION SET AND APPLYING METHOD THEREOF

(71) Applicant: APPLIED LACQUER INDUSTRIES INC., City of Industry, CA (US)

(72) Inventors: Wan Jou Chen, Walnut, CA (US); Carol Ma, Hacienda Heights, CA (US)

(73) Assignee: APPLIED LACQUER INDUSTRIES INC., City of Industry, CA (US)

( * ) Notice: This patent is subject to a terminal disclaimer.

(21) Appl. No.: 18/310,320

(22) Filed: May 1, 2023

Related U.S. Patent Documents

Reissue of:

(64) Patent No.: 11,224,276
Issued: Jan. 18, 2022
Appl. No.: 16/299,103
Filed: Mar. 11, 2019

U.S. Applications:

(63) Continuation of application No. 15/916,216, filed on Mar. 8, 2018, now Pat. No. 11,304,492.

(51) Int. Cl.

| | |
|---|---|
| ***A45D 31/00*** | (2006.01) |
| ***A45D 29/04*** | (2006.01) |
| ***A45D 29/12*** | (2006.01) |
| ***A45D 29/18*** | (2006.01) |
| ***C09D 175/16*** | (2006.01) |
| ***C09J 175/14*** | (2006.01) |
| ***H10K 50/818*** | (2023.01) |
| ***H10K 59/12*** | (2023.01) |
| ***H10K 59/38*** | (2023.01) |
| ***H10K 71/00*** | (2023.01) |
| ***H10K 77/10*** | (2023.01) |

(52) U.S. Cl.

CPC ..... *A45D 31/00* (2013.01); *A45D 29/18* (2013.01); *C09D 175/16* (2013.01); *C09J 175/14* (2013.01); *H10K 50/818* (2023.02); *H10K 59/12* (2023.02); *H10K 59/38* (2023.02); *H10K 71/00* (2023.02); *H10K 77/10* (2023.02); *A45D 29/04* (2013.01); *A45D 29/12* (2013.01); *A45D 2200/205* (2013.01); *A45D 2200/25* (2013.01); *H10K 59/1201* (2023.02)

(58) Field of Classification Search

CPC ..... C08F 290/067; C08F 220/20; C08F 222/104; A45D 29/18; A45D 29/00; A45D 29/04; A45D 2200/205; A45D 29/12; A45D 2200/25; C09D 175/16; H10K 59/12; H10K 71/00; H10K 77/10; H10K 59/1201; C08L 75/16; C09J 175/14

See application file for complete search history.

(56) References Cited

U.S. PATENT DOCUMENTS

| | | | | |
|---|---|---|---|---|
| 6,394,100 | B1 * | 5/2002 | Chang | A61Q 3/00 132/200 |
| 10,500,144 | B2 | 12/2019 | Takemoto | |
| 2007/0235051 | A1 * | 10/2007 | Robinson | A45D 29/18 132/73.5 |
| 2010/0008876 | A1 * | 1/2010 | Tanaka | A45D 31/00 424/61 |
| 2011/0256079 | A1 | 10/2011 | Kozachek | |
| 2013/0333713 | A1 * | 12/2013 | Mehta | A45D 29/00 132/75 |
| 2015/0224045 | A1 * | 8/2015 | Doan | A61Q 3/02 132/200 |

FOREIGN PATENT DOCUMENTS

WO 2017/082058 A1 5/2017

OTHER PUBLICATIONS

Japan Patent Office: "Notice of Reasons for Rejection" re: Japanese patent application serial No. 2019-039243, Mailing Date: Sep. 7, 2021, 5 pages.

European Patent Office: "Extended European Search Report" re: EPO patent application serial No. 19764584.9, Mailing Date: Nov. 21, 2021, 8 pages.

Nailpromagazine, XP No. 55861387, "How to Apply Apres GEI Nail Extensions" <https://www.youtube.com/watch?v=MNczt_gcU_w&t=14s>; Online Publication Date Dec. 12, 2017, accessed Nov. 15, 2021.

Daily Charme Diamond Shine No-Wipe Gel Top Coat, <https://dailycharme.com/products/daily-charme-diamond-shine-gel-top-coat#!#shopify-product-reviews> prior to Dec. 20, 2017 (Year: 2017).

Daily Charme Diamond Shine No-Wipe Gel Top Coat, <https://dailycharme.com/products/daily-charme-diamond-shine-gel-top-coat#!#shopify-product-reviews> prior to Dec. 20, 17 (Year: 2017).*

Bluesky UV Gel, <http://www.beauty-product.nl/PDF/MSDS3steps.pdf>; available Feb. 12, 2015; accessed Aug. 14, 2020 (Year: 2015).*

Sree Roy, <https://www.nailsmag.com/387143/the-science-of-gels-how-gel-nail-products-work>; available Mar. 14, 2011; accessed Aug. 14, 2020 (Year: 2011).*

(Continued)

*Primary Examiner* — Joseph R Kosack

(74) *Attorney, Agent, or Firm* — Pillsbury Winthrop Shaw Pittman LLP

(57) ABSTRACT

A nail tip curing composition includes an Extend Gel, an edge-off flat brush, a nail filing device, a plurality of GEL-X tips, a pH Bonder, and a Non-Acidic Gel Primer. The pH Bonder forms a pH Bonder layer on a surface of a fingernail. The Non-Acidic Gel Primer forms a Non-Acidic Gel Prime layer overlapped on the pH Bonder layer. The Extend Gel forms an Extend Gel layer overlapped on the Non-Acidic Gel Prime layer. The GEL-X tip is filed by the nail filing device and the Extend Gel is applied on an underside contact surface of the Gel-X tip by the edge-off flat brush. The underside contact surface of the Gel-X tip is contacted with the Extend Gel layer on the fingernail in such a manner that the Gel-X tip is firmly affixed on the fingernail.

10 Claims, 9 Drawing Sheets

(56) References Cited

OTHER PUBLICATIONS

Nails at Panache, <https://nailsatpanache.wordpress.com/2013/05/15/do-it-yourself-acrylic-part-2/>; accessed Feb. 5, 2021; available May 15, 2013 (Year: 2013).*

Kay. Tiny plastic fingernails <http://tinyplasticfingernails.blogspot.com/2011/07/what-i-learned-at-kiss-nails-webinar.html> available Jul. 7, 2011; accesses Feb. 4, 2021 (Year: 2011).

Screen captures from You Tube video clip entitled "Apres Gel-X: Entire Set Demo", 7 pages, uploaded on Aug. 11, 2017 by user "Apres Nails Official". Retrieved from Internet: <https://www.youtube.com/watch?v=KvUkLmYHI0w>. (Year: 2017).

The State Intellectual Property Office of People's Republic of China: "First Office Action" re: Chinese patent application serial No. 2019101761116.3 dated Aug. 25, 2021, 33 pages.

European Patent Office: "Extended European Search Report" re: EPO patent application serial No. 19764584.9, dated Nov. 21, 2021, 8 pages.

Nailpromagazine, XP No. 55861387, "How to Apple Apres GEI Nail Extensions" >https://www.youtube.com/watch?v=MNczt_gcU_w&t=14s>; Online Publication Date Dec. 12, 2017, accessed Nov. 15, 2021.

* cited by examiner

| Extend Gel 10 | | |
|---|---|---|
| CHEMICAL NAME | CAS NUMBER | WT/WT % |
| Polyurethane Acrylate Oligomer 11 | NA | 60.0-80.0% |
| 2-Hydroxyethyl methacrylate 12 | 868-77-9 | 10.0-15.0% |
| 1-Hydroxycyclohexyl phenyl ketone 13 | 947-19-3 | 1.0-5.0% |
| Phenylbis(2,4,6-trimethylbenzoyl)phosphine oxide 14 | 162881-26-7 | 1.0-5.0% |

FIG.12

| MSDS top gel coat **70** | | | |
|---|---|---|---|
| CHEMICAL NAME | CAS # | EINECS # | % |
| Polyurethane Acrylate Oligomers **71** | Exempt | N/A | 35.0-50.0% |
| 2-Hydroxyethyl methacrylate (HEMA) **72** | 868-77-9 | N/A | 15.0-30.0% |
| Di(trimethylolpropane) tetraacrylate **73** | 94108-97-1 | N/A | 10.0-25.0% |
| Pentaerythritol tetrakis(3-mercaptopropionate) (PETMP) **74** | 7575-23-7 | N/A | 5.0-10.0% |
| Polyether-Modified Polysiloxane **75** | 157479-55-5 | N/A | 0.0-1.0% |

FIG. 13

ARTIFICIAL NAIL TIP AND CURING COMPOSITION SET AND APPLYING METHOD THEREOF

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS REFERENCE OF RELATED APPLICATION

This is a Continuation application that claims the benefit of priority under 35 U.S.C. § 120 to a non-provisional application, application Ser. No. 15/916,216, filed Mar. 8, 2018. The afore-mentioned patent application is hereby incorporated by reference in its entirety.

NOTICE OF COPYRIGHT

A portion of the disclosure of this patent document contains material which is subject to copyright protection. The copyright owner has no objection to any reproduction by anyone of the patent disclosure, as it appears in the United States Patent and Trademark Office patent files or records, but otherwise reserves all copyright rights whatsoever.

BACKGROUND OF THE PRESENT INVENTION

Field of Invention

The present invention relates to a nail tip composition, and more particularly to a set of artificial nail tip and curing composition set and applying method thereof, which not only can reduce the curing and hardening time of the artificial nail tip on the fingernail but also can prevent unnecessary damages to fingernails.

Description of Related Arts

Gel nail art is a decorate beautification work of nails, which is considered as an art design nowadays. The gel nail art has the characteristics of the diversification of various forms. According to the hand shape, the finger nail shape, the color of the skin, clothing and other requirements, the gel nail art is a process of nail disinfection, cleaning, care, maintenance, and decorate beautification. Currently, during the gel nail process, phototherapy is used for accelerated weathering. Some people used to do a hand care at first before using the phototherapy manicures. However, exfoliator results in thinning of the skin, which further cause skin aging if the fingernail is directly exposed under the phototherapy lamp such as UV or blue light without sunscreen. The improper gel nail art may cause nail damage, which even causes separation of the nail and the nail bed under the nails and eventually leads to shorter nail bed. Therefore, healthy nail composition as well as the right nail tools are required.

SUMMARY OF THE PRESENT INVENTION

The invention is advantageous in that it provides an artificial nail tip and curing composition set and applying method thereof, which not only decorates fingernails but also protects the fingernails.

Another advantage of the invention is to provide an artificial nail tip and curing composition set and applying method thereof, which not only can reduce the curing and hardening time of the artificial nail tip on the fingernail but also can prevent unnecessary damages to fingernails.

Another advantage of the invention is to provide an artificial nail tip and curing composition set and applying method thereof, which includes an Extend Gel for firmly affixing the artificial nail tips, namely GEL-X tips, to the surface of the fingernails.

Another advantage of the invention is to provide an artificial nail tip and curing composition set and applying method thereof, which protects the fingernails and reduces the UV damage.

Additional advantages and features of the invention will become apparent from the description which follows, and may be realized by means of the instrumentalities and combinations particular point out in the appended claims.

According to the present invention, the foregoing and other objects and advantages are attained by an artificial nail tip and curing composition set, comprising:

at least an artificial nail tip, namely GEL-X tip, an Extended Gel, an edge-off flat brush, a nail filing device, a pH Bonder, and a Non-Acidic Gel Primer, wherein the pH Bonder forms a pH Bonder layer on a surface of a fingernail, wherein the Non-Acidic Gel Primer forms a Non-Acidic Gel Prime layer overlapped on the pH Bonder layer, wherein the Extend Gel forms a Extend Gel layer overlapped on the Non-Acidic Gel Prime layer, wherein an underside contact surface of the GEL-X tip is filed by the nail filing device to provide a rough affixing surface and the Extend Gel is applied on an underside contact surface of the Gel-X tip by the edge-off flat brush until at least the rough affixing surface is completely covered with the Extend Gel to form an adhering layer, wherein the underside contact surface of the Gel-X tip is contacted with the Extend Gel layer on the fingernail in such a manner that the Gel-X tip is firmly affixed on the fingernail.

According to the present invention, the foregoing and other objects and advantages are also attained by an applying method of a nail tip composition, comprising the steps of:

(a) forming a PH Bonder layer on a surface of a fingernail by applying a pH Bonder to the fingernail;

(b) forming a Non-Acidic Gel Primer layer overlapped on the pH Bonder layer by applying a Non-Acidic Gel Primer to the fingernail;

(c) forming an Extend Gel layer overlapped on the Non-Acidic Gel Primer layer using an edge-off flat brush by applying a layer of the Extend Gel to the fingernail;

(d) providing a rough affixing surface on an underside contact surface of the Gel-X tip, wherein the step (d) can be applied before the step (a);

(e) applying the Extend Gel to the underside contact surface of the Gel-X tip to form an Extend Gel tip layer, for example using an edge-off flat brush;

(f) pressing the Gel-X tip onto the fingernail gradually from base to tip thereof to prevent air bubbles and to ensure a tight seal; and (g) pressing down on the Gel-X tip and the fingernail by an external force until the Extend Gel tip layer on the rough affixing surface 411 is cured and hardened with the Extend Gel layer on the fingernail 90, such that the Gel-X tip is firmly attached to the fingernail.

In one embodiment, the step (d) can be accomplished by filing the underside contact surface of the Gel-X tip by a nail filing device.

In one embodiment, the step (g) can be executed under exposure to UV or LED lighting for at least two minutes for curing and hardening.

Still further objects and advantages will become apparent from a consideration of the ensuing description and drawings.

These and other objectives, features, and advantages of the present invention will become apparent from the following detailed description, the accompanying drawings, and the appended claims.

BRIEF DESCRIPTION OF THE DRAWINGS

FIG. 12 is a table illustrating the chemical compositions of the Extend Gel of the nail tip curing composition according to the above preferred embodiment of the present invention.

FIG. 13 is a table illustrating the chemical compositions of the MSDS top gel coat of the nail tip curing composition according to the above preferred embodiment of the present invention.

DETAILED DESCRIPTION OF THE PREFERRED EMBODIMENT

The following description is disclosed to enable any person skilled in the art to make and use the present invention. Preferred embodiments are provided in the following description only as examples and modifications will be apparent to those skilled in the art. The general principles defined in the following description would be applied to other embodiments, alternatives, modifications, equivalents, and applications without departing from the spirit and scope of the present invention.

Figure 9:
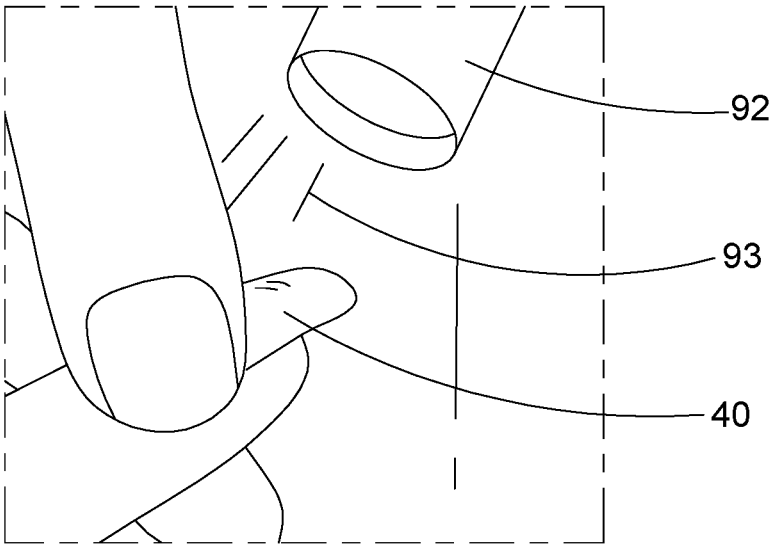
FIG. 9 is a schematic view illustrating the applying method of the artificial nail tip and curing composition set according to the above preferred embodiment of the present invention.
Figure 10:
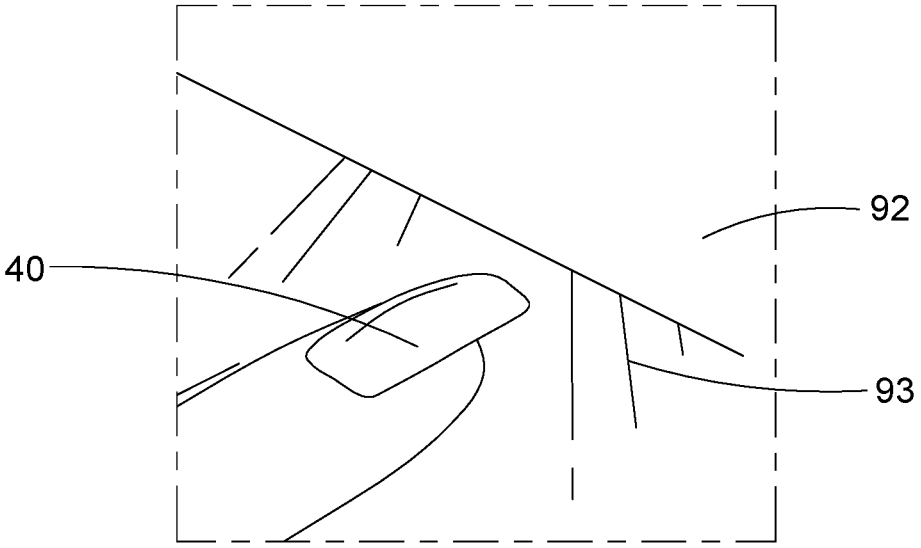
FIG. 10 is a schematic view illustrating the applying method of the artificial nail tip and curing composition set according to the above preferred embodiment of the present invention.
Figure 11:
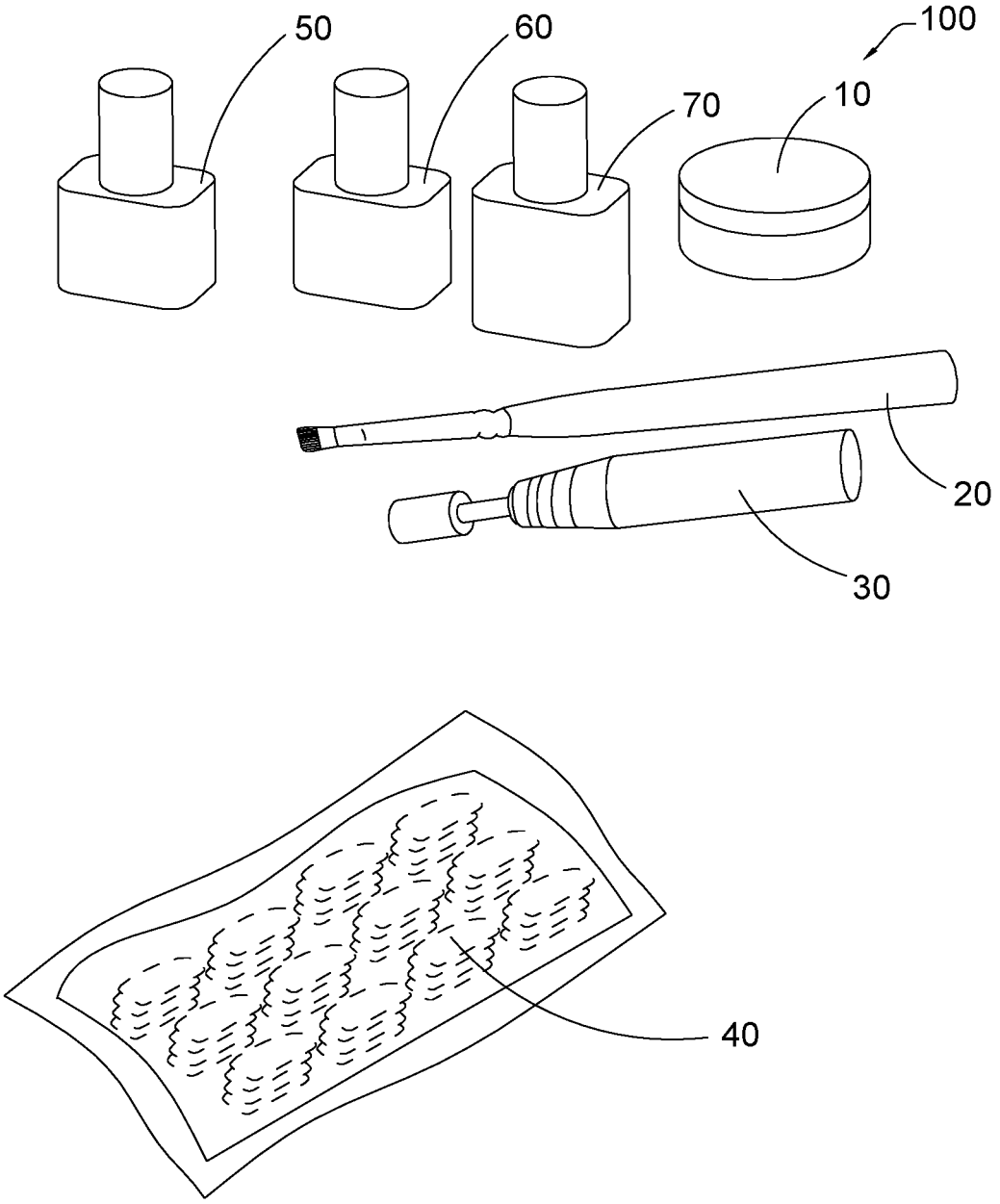
FIG. 11 is a perspective view illustrating the nail tip curing composition set according to the above preferred embodiment of the present invention.

Referring to FIG. 1 to FIG. 11 of the drawings, an artificial nail tip and curing composition set 100 according to a preferred embodiment is illustrated, wherein the nail tip curing composition set 100 comprises an Extend Gel 10, an edge-off flat brush 20, a nail filing device 30, a plurality of artificial nail tips 40 embodied and named as GEL-X tips, a pH Bonder 50, and a Non-Acidic Gel Primer 60, as shown in FIG. 11. The Extend Gel 10 is used as GEL-X tips adhesive.

Figure 1:
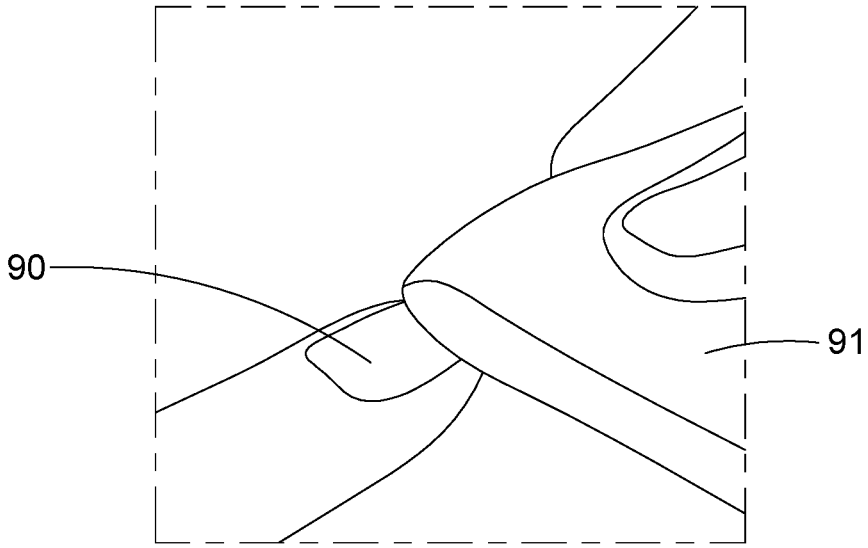
FIG. 1 is a schematic view illustrating an applying method of an artificial nail tip and curing composition set according to a preferred embodiment of the present invention.

As shown in FIG. 1 of the drawings, before using the nail tip curing composition set 100, a fingernail 90 is wiped to be cleaned by a cotton pad 91 soaked with rubbing alcohol, so that the fingernail 90 is cleaned to remove oil and dust thereon.

Figure 2:
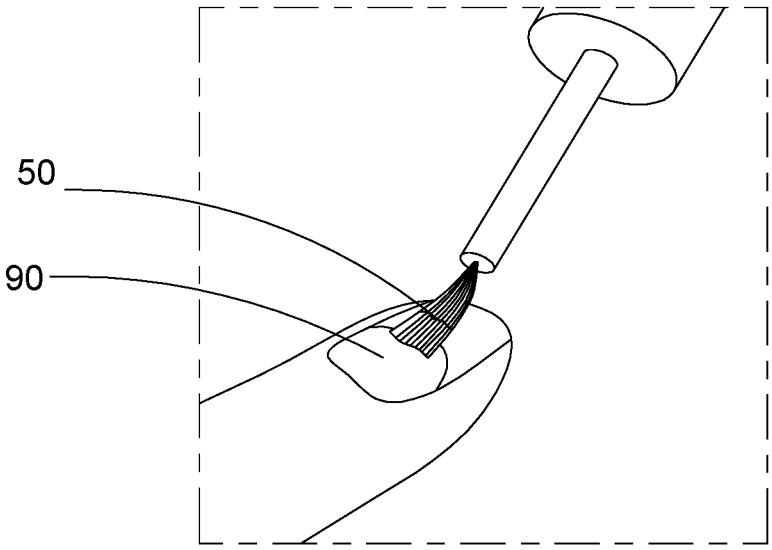
FIG. 2 is a schematic view illustrating the applying method of the artificial nail tip and curing composition set according to the above preferred embodiment of the present invention.
Figure 3:
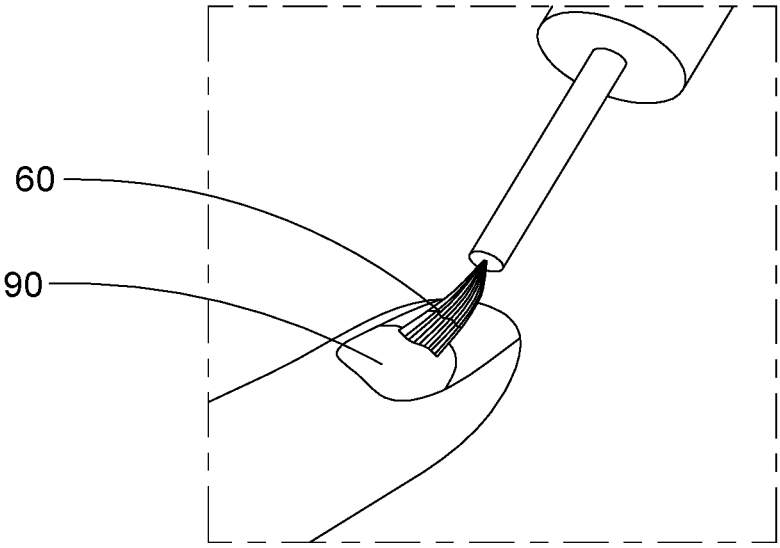
FIG. 3 is a schematic view illustrating the applying method of the artificial nail tip and curing composition set according to the above preferred embodiment of the present invention.
Figure 4:
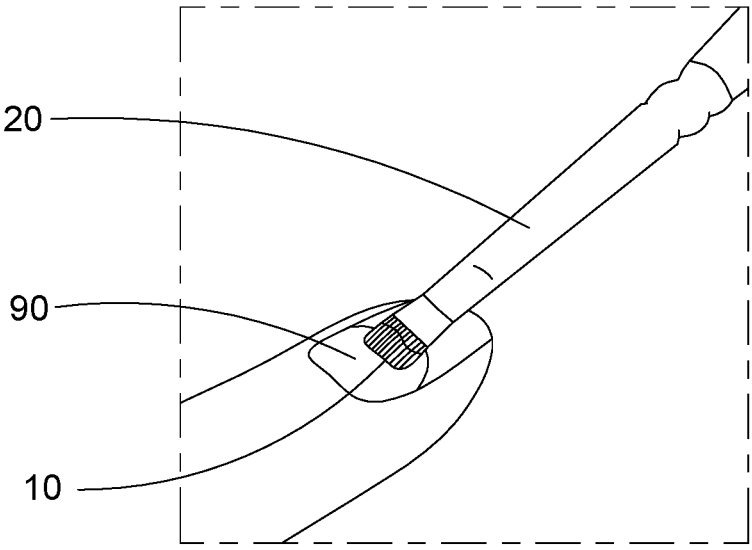
FIG. 4 is a schematic view illustrating the applying method of the artificial nail tip and curing composition set according to the above preferred embodiment of the present invention.

As shown in FIG. 2 of the drawings, the pH Bonder 50 is applied on the fingernail 90 to form a pH Bonder layer on the surface of the fingernail 90. When the pH Bonder layer applied on the fingernail 90 is aired rapidly, the Non-Acidic Gel Primer 60 is applied on the fingernail 90. Specifically, as shown in FIG. 3 of the drawings, the Non-Acidic Gel Primer 60 is applied on the fingernail 90 to form a Non-Acidic Gel Prime layer on the surface of the fingernail 90, which is overlapped on the pH Bonder layer. When the Non-Acidic Gel Prime layer applied on the fingernail 90 is aired rapidly, the edge-off flat brush 20 is used to apply a thin layer of the Extend Gel 10 to the fingernail 90. Specifically, as shown in FIG. 4 of the drawings, the thin layer of the Extend Gel 10 is applied on the fingernail 90 to form an Extend Gel layer overlapped on the Non-Acidic Gel Prime layer.

Figure 5:
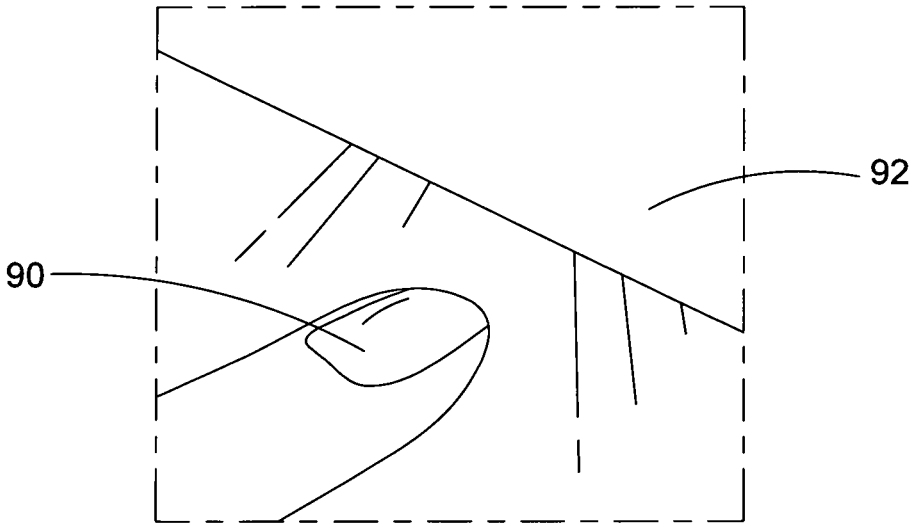
FIG. 5 is a schematic view illustrating the applying method of the artificial nail tip and curing composition set according to the above preferred embodiment of the present invention.

As shown in FIG. 5 of the drawings, according to the preferred embodiment of the present invention, the Extend Gel layer formed by the Extend Gel 10 and overlapped on the Non-Acidic Gel Prime layer on the fingernail 90 is cured with a LED lamp 92 for a period of time, such as about 30 seconds. Alternatively, the Extend Gel layer formed by the Extend Gel 10 and overlapped on the Non-Acidic Gel Prime layer on the fingernail 90 can also be cured with UV lamp for a period of time, such as about 2 minutes.

Regarding to the artificial nail tips, namely Gel-X tips 40, made of for example acrylic material, are used as the artificial nail tips according to the preferred embodiment of the present invention. Before attaching the Gel-X tips 40 on the fingernails, a rough affixing surface 411 is provided on an underside contact surface 41 of each Gel-X tip, which is the lower inner portion of the Gel-X tip having a surface area approximately equal to the surface area of the fingernail that the Gel-X tip is going to in contact with and affixing thereon. The rough affixing surface 411 can be made when it is manufacturing to provide a coarse surface other than the generally smooth surface required on the underside surface and topside surface of the finger nail. On the rough affixing surface 411, multiple indented grooves 412 are formed.

Figure 6:
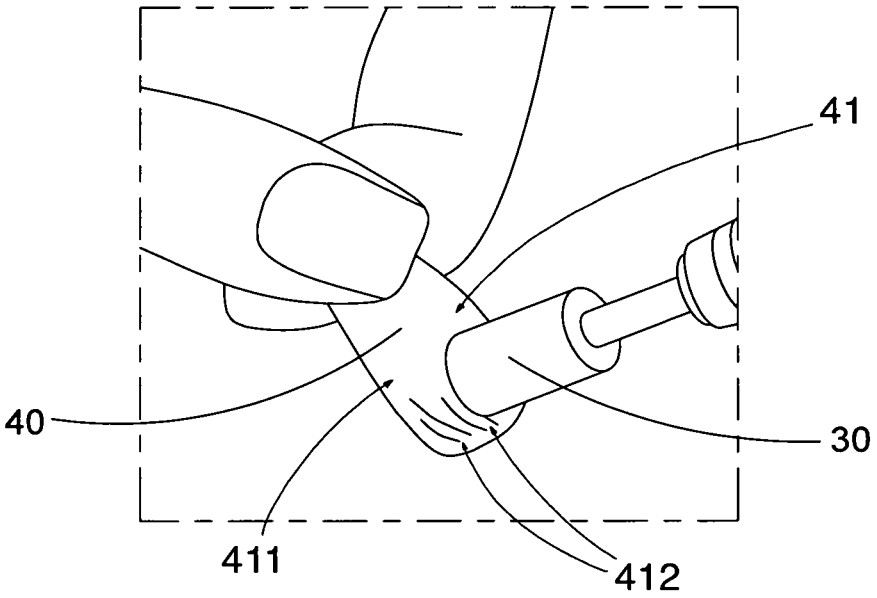
FIG. 6 is a schematic view illustrating the applying method of the artificial nail tip and curing composition set according to the above preferred embodiment of the present invention.

According to the preferred embodiment, the rough affixing surface 411 is provided by means of the nail filing device 30. The underside contact surface 41 is filed by the nail filing device 30 to form the rough affixing surface 411 having multiple small indented grooves 412 thereon, as shown in FIG. 6. It is appreciated that a health fingernail will generally have a smooth surface. In order to enhance the affixing of the artificial nail tip on the fingernail surface, the conventional way to slightly file the fingernail surface and then apply the glue thereon for adhering the artificial nail tip on the fingernail. To prevent causing unnecessary damages to the fingernail, the formation and providing of the rough affixing surface 411 on the underside contact surface 41 of the Gel-X tip 40 is essential for affixing the Gel-X tips 40 to the fingernails according to the preferred embodiment of the present invention.

In other words, starting from a base portion of the underside contact surface 41 of the Gel-X tip, generally half of the underside contact surface 41 is filed to form the rough affixing surface 411. The rough affixing surface 411, especially the presence of the multiple indented grooves 412 formed thereon making the surface 411 a coarse surface, greatly increases the contacting surface area of the rough affixing surface 411 to pick up the Extend Gel 10. Therefore, when the Gel-X tip adhesive, i.e. the Extend Gel 10, can be retained to the rough affixing surface 411 of each of the Gel-X tips 40 than a smooth surface having the same size.

Figure 7:
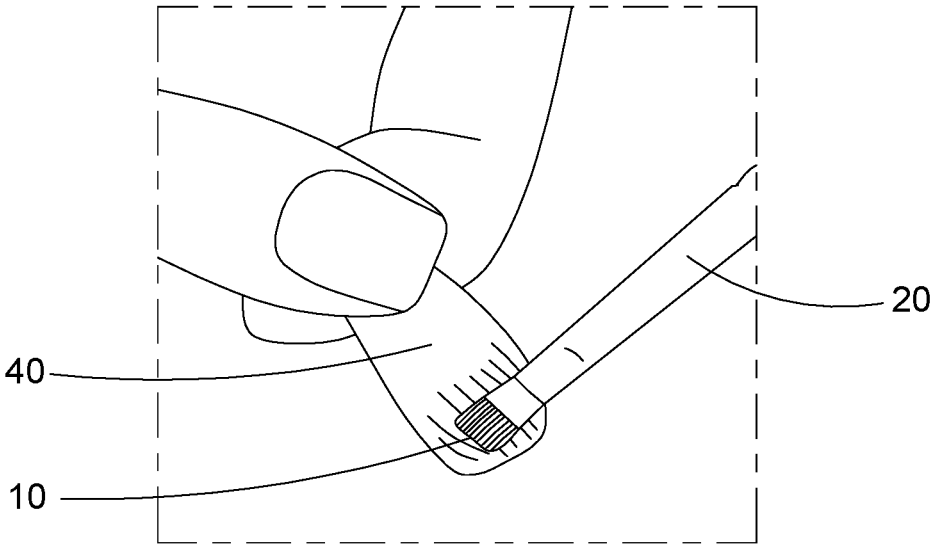
FIG. 7 is a schematic view illustrating the applying method of the artificial nail tip and curing composition set according to the above preferred embodiment of the present invention.

As shown in FIG. 7 of the drawings, a small drop of the Extend Gel 10, which is enough to cover the natural fingernail, is applied to a base portion of the rough affixing surface 411 of the underside contact surface 41 of Gel-X nail tip 40 by the edge-off flat brush 20, generally about ⅓ of the surface area of the natural fingernail, to form an Extend Gel tip layer on the rough affixing surface 411 of the Gel-X tip 40. The Extend Gel 10 will flow into the multiple indented grooves 412 and be retained therein. In other words, the multiple indented grooves 412 of the rough affixing surface 411 can retain more Extend Gel 10. Therefore, when the rough affixing surface 411 is in contact with the fingernail surface, the Extend Gel layer will attach and affix the Gel-X tip 40 onto the fingernail 90, wherein the retaining of the Extend Gel 10 in the multiple indented grooves 412 substantially increases the thickness of the Extend Gel 10 between the Gel-X tip 40 and the fingernail 90 that effectively increases the adhering bonding of the Gel-X tip 40 and the fingernail 90 so as to more firmly affix the Gel-X top 40 with the fingernail 90 with less curing and hardening time.

Figure 8:
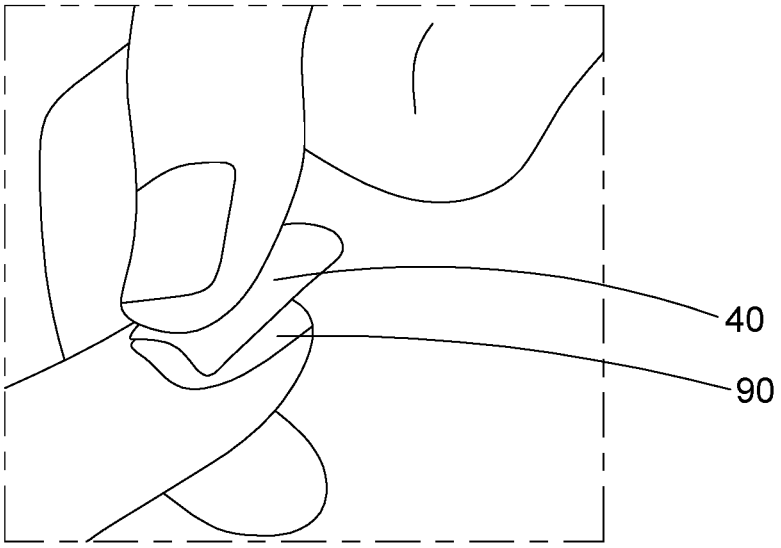
FIG. 8 is a schematic view illustrating the applying method of the artificial nail tip and curing composition set according to the above preferred embodiment of the present invention.

Referring to in FIG. 8 of the drawings, after the Extend Gel 10 is applied on the rough affixing surface 411 of the underside contact surface 41 of the Gel-X tip 40, the Gel-X nail tip 40 is pressed onto the fingernail 90 gradually from base to tip of the Gel-X nail tip 40 to prevent air bubbles or lifting and to ensure a tight seal.

As shown in FIG. 9 of the drawings, an external force is pressed down the Gel-X tip 40 and the fingernail 90, and then the fingernail 90 with the Gel-X tip 40 are cured with the LED lighting 93 of the LED lamp 92 for seconds such as about 10 seconds. The LED lamp 93, which can be a LED flashlight as shown in FIG. 9 or a bridge light for sitting on a table surface to define a receiving cavity between the LEDs provided on an underside of the bridge light and the table surface, so that fingernail 90 with the Gel-X tip 40 pressing down thereon can be placed within the receiving cavity and treated under the LED lighting 93. Eventually, the external force pressing down the Gel-X tip 40 and the fingernail 90 is removed and the LED lighting 93 from the LED lamp 92 is applied around the Gel-X tip 40 to ensure all sides of the Gel-X tip 40 being cured and hardened.

Then, as shown in FIG. 10 of the drawings, the entire fingernail 90 with the Gel-X tip 40 affixed thereon can be cured under the LED lamp 92 for a few seconds such as 30 seconds, until the Extend Gel tip layer on the rough affixing surface 411 of the underside contact surface 41 of the Gel-X tip 40 and the Extend Gel layer on the fingernail 90 are cured and hardened integrally to form a bonding Extend Gel layer between the Gel-X tip 40 and the fingernail 90. In maximum, application of about 2 minutes of LED lighting to affix the Gel-X tip 40 on the fingernail 90 could be more than enough. Alternatively, the entire fingernail 90 is cured by the UV lamp for a few minutes such as about 2 minutes.

It is worth mentioning that since the Extend Gel 10 of the Extend Gel tip layer is retained in the indented grooves 412 of the rough affixing surface 411 of the underside contact surface 41 of the Gel-X tip 40, the Extend Gel 10 retained in the indented grooves 412 can act like roots to hold the Gel-X tip 40 to the fingernail 90 that greatly enhances the bonding and adhering ability of the cured and hardened bonding Extend Gel layer between Gel-X tip 40 and the fingernail 90 while a relatively thin bonding Extend Gel layer is enough to affix the Gel-X tip 40 on the fingernail 90 firmly for a relatively longer lift span for at least couple weeks. Also, the thinner the bonding Extend Gel layer, the shorter the curing and hardening time by the LED lighting is required that can greatly shorten the total time required for affixing ten nail tips to ten fingernails of the user.

To detach the Gel-X tips 40 from the fingernails 90, the user may simply soaking the fingernail 90 with the Gel-X tip 40 thereon into an acetone for a period of time and the Gel-X tip 40 will separate from the fingernail 90.

It is worth mentioning that the Extend Gel 10 is used as a GEL-X tip adhesive. The chemical formulation of the Extend Gel 10 is based on acrylate/methacrylate chemistry, and contains monofunctional and multifunctional acrylate/methacrylate monomers/oligomers and photoinitiators. The Extend Gel 10 in the uncured state is a potential sensitizer, a primary eye irritant and a moderate skin irritant.

Specifically, as shown in FIG. 12 of the drawings, the chemical composition of the Extend Gel 10 includes a Polyurethane Acrylate Oligomer 11, a 2-Hydroxyethyl methacrylate 12, a 1-Hydroxycyclohexyl phenyl ketone 13 and a Phenylbis(2,4,6-trimethylbenzoyl)phosphine oxide 14.

More specifically, a basic proportion range of the Polyurethane Acrylate Oligomer 11 by weight is 60.0-80.0%, a basic proportion range of the 2-Hydroxyethyl methacrylate 12 by weight is 10.0-15.0%, a basic proportion range of the 1-Hydroxycyclohexyl phenyl ketone 13 by weight is 1.0-5.0%, and a basic proportion range of the Phenylbis(2,4,6-trimethylbenzoyl)phosphine oxide 14 by weight is 1.0-5.0%.

It is worth mentioning that the specific gravity of the Extend Gel 10 is 1.06-1.08 and the Vapor Pressure, (mm Hg) is C:<0.01.

As shown in FIG. 11 and FIG. 13 of the drawings, the nail tip composition kit 100 further comprises a MSDS top gel coat 70 applied on the fingernail 90.

Specifically, as shown in FIG. 13 of the drawings, the chemical composition of the MSDS top gel coat 70 includes a Polyurethane Acrylate Oligomers 71, a 2-Hydroxyethyl methacrylate(HEMA) 72, a Di-Trimethylolpropane Tetraacrylate 73, a PETMP 74, and a Polyether-Modified Polysiloxane 75.

More specifically, a basic proportion range of the Polyurethane Acrylate Oligomers 71 by weight is 35.0-50.0%, a basic proportion range of the 2-Hydroxyethyl methacrylate (HEMA) 72 by weight is 15.0-30.0%, a basic proportion range of the Di-Trimethylolpropane Tetraacrylate 73 by weight is 10.0-25.0%, a basic proportion range of the PETMP 74 by weight is 5.0-10.0%, and a basic proportion range of the Polyether-Modified Polysiloxane 75 is 0.0-1.0%.

It is worth mentioning that the boiling point of the MSDS top gel coat 70 is 212° F.

It is worth mentioning that the flash point (° F.) of the MSDS top gel coat 70 is 96° F.

It is worth mentioning that the specific gravity of the MSDS top gel coat 70 is 1.14.

It is worth mentioning that when users need to take off the GEL-X tips 40, they can either wrap in cotton soaked acetone in the foil or literally soak the fingernail 90 with the GEL-X tips 40 in a bowl of acetone.

Figure 14:
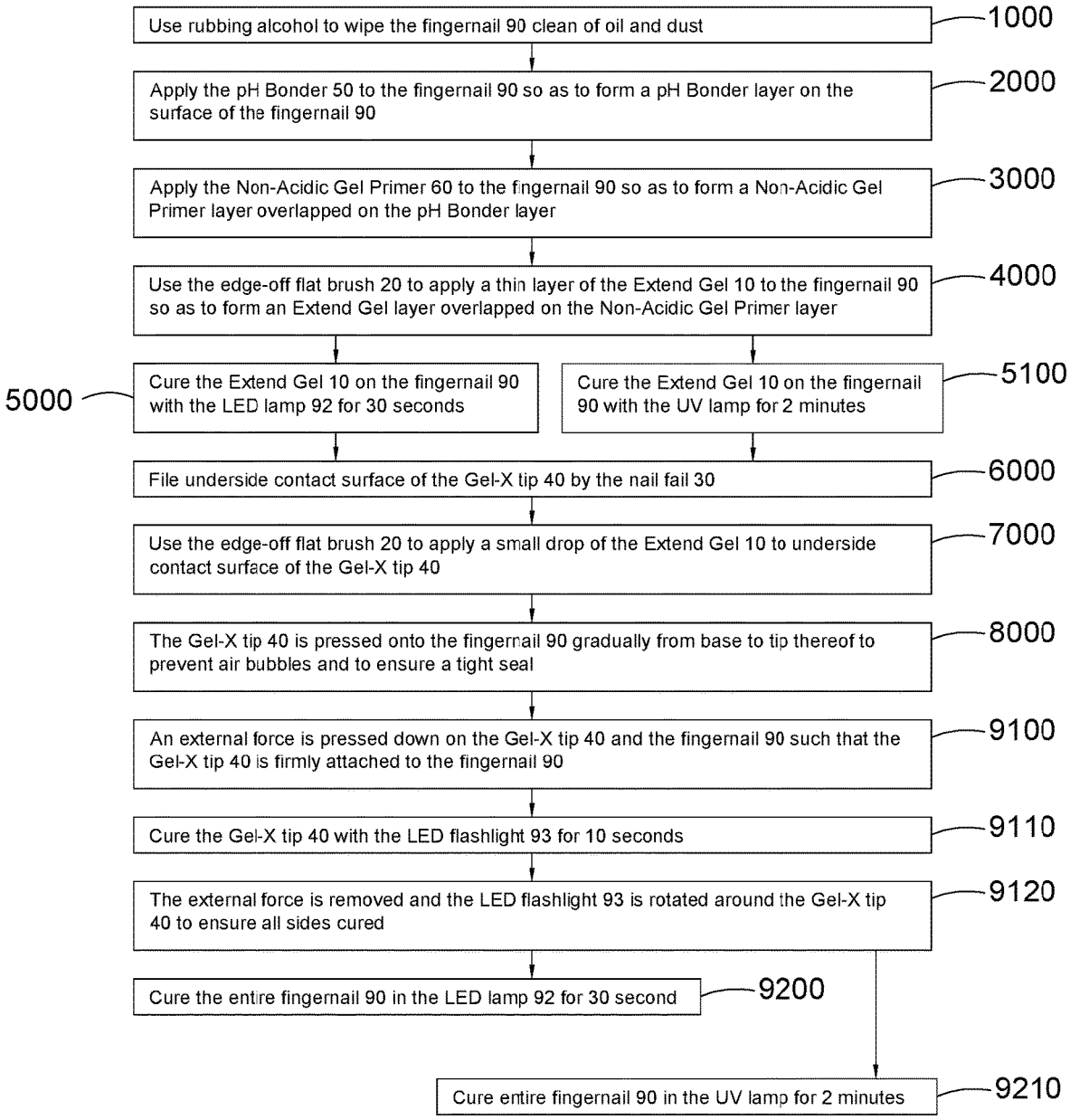
FIG. 14 is a flow diagram of the applying method of the artificial nail tip and curing composition set according to the above preferred embodiment of the present invention.

Also referring to FIG. 14 of the drawings, an applying method of a nail tip composition according to the above preferred embodiment comprises the following steps.

(1000) Use rubbing alcohol to wipe the fingernail 90 to clean off oil and dust on the fingernail 90.

(2000) Apply the pH Bonder 50 to the fingernail 90 so as to form a pH Bonder layer on the surface of the fingernail 90.

(3000) Apply the Non-Acidic Gel Primer 60 to the fingernail 90 so as to form a Non-Acidic Gel Primer layer overlapped on the pH Bonder layer.

(4000) Use the edge-off flat brush 20 to apply a thin layer of the Extend Gel 10 to the fingernail 90 so as to form an Extend Gel layer overlapped on the Non-Acidic Gel Primer layer.

(5000) Cure the Extend Gel 10 on the fingernail 90 with the LED lamp 92 for about 30 seconds.

(6000) File the underside contact surface 41 of the Gel-X tip 40 by the nail filing device 30 to form the rough affixing surface 411.

(7000) Use the edge-off flat brush 20 to apply a small drop of the Extend Gel 10 to at least a base portion of the rough affixing surface 411 of the underside contact surface 41 of the Gel-X tip 40 to form an Extend Gel tip layer.

(8000) The Gel-X tip 40 is pressed onto the fingernail 90 gradually from base to tip thereof to prevent air bubbles and to ensure a tight seal.

(9100) An external force is pressed down on the Gel-X tip 40 and the fingernail 90 until the Extend Gel tip layer on the rough affixing surface 411 is cured and hardened with the Extend Gel layer on the fingernail 90, such that the Gel-X tip 40 is firmly attached to the fingernail 90.

(9110) Cure the Gel-X tip 40 with the LED flashlight 93 for about 10 seconds.

(9120) The external force is removed and the LED flashlight 93 is rotated around the Gel-X tip 40 to ensure all sides cured.

(9200) Cure the entire fingernail 90 in the LED lamp 92 for 30 seconds.

It is worth mentioning that, alternatively, the step (5000) is able to be replaced by a step: (5100) Cure the Extend Gel 10 on the fingernail 90 with the UV lamp for about 2 minutes.

It is worth mentioning that alternatively, the step (9200) is able to be replaced by a step: (9210) Cure entire fingernail 90 in the UV lamp for about 2 minutes.

It is worth mentioning that in the applying method of the nail tip composition kit 100 according to the preferred embodiment of the present invention, the chemical composition of the Extend Gel 10 includes 60.0-80.0% by weight of the Polyurethane Acrylate Oligomer 11, 10.0-15.0% by weight of the 2-Hydroxyethyl methacrylate 12, 1.0-5.0% by weight of the 1-Hydroxycyclohexyl phenyl ketone 13, and 1.0-5.0% by weight of the Phenylbis(2,4,6-trimethylbenzoyl)phosphine oxide 14.

It is worth mentioning that the applying method of the nail tip composition kit 100 further comprises a step of: applying the MSDS top gel coat 70 used on the fingernail 90.

It is worth mentioning that in the applying method of the nail tip composition kit 100 according to the preferred embodiment of the present invention, the chemical composition of the MSDS top gel coat 70 includes 35.0-50.0% by weight of the Polyurethane Acrylate Oligomers 71, 15.0-30.0% by weight of the 2-Hydroxyethyl methacrylate (HEMA) 72, 10.0-25.0% by weight of the Di-Trimethylolpropane Tetraacrylate 73, 5.0-10.0% by weight of the PETMP 74, and 0.0-1.0% by weight of the Polyether-Modified Polysiloxane 75.

One skilled in the art will understand that the embodiment of the present invention as shown in the drawings and described above is exemplary only and not intended to be limiting.

It will thus be seen that the objects of the present invention have been fully and effectively accomplished. The embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. An artificial nail and curing composition set for a fingernail, comprising:

at least one artificial nail tip, the artificial nail tip being made of acrylic material and having an underside surface which can be filed into a plurality of indented grooves;

a nail filing device configured for filing the underside surface of an artificial nail tip to form a plurality of indented grooves;

an adhesive composition consisting of:

(a) [60.0] *75*-80.0% by weight of polyurethane acrylate oligomers;

(b) 10.0-15.0% by weight of 2-hydroxyethyl methacrylate;

(c) 1.0-5.0% by weight of 1-hydroxycyclohexyl phenyl ketone;

(d) 1.0-5.0% by weight of phenylbis(2,4,6-trimethylbenzoyl)phosphine oxide; and a flat brush for applying the adhesive composition to the plurality of indented grooves on the underside of an artificial nail tip and to a surface of a fingernail;

wherein curing the adhesive composition with UV light for about 2 minutes forms a bonding layer between the indented grooves on the underside of the artificial nail tip and the surface of the fingernail; and wherein the bonding layer affixes the artificial nail tip to the surface of the fingernail for at least two weeks.

2. The artificial nail and curing composition set of claim 1 further comprising a LED lamp.

3. The artificial nail and curing composition set of claim 1 wherein the adhesive composition has a specific gravity of 1.06-1.08.

4. The artificial nail and curing composition set of claim 2 wherein the adhesive composition has a specific gravity of 1.06-1.08.

5. The artificial nail and curing composition set of claim 1 further comprising a top coat composition for application to the artificial nail tip, the top coat composition consisting essentially of:

(a) 35.0-50.0% by weight of polyurethane acrylate oligomers;

(b) 15.0-30.0% by weight of 2-hydroxyethyl methacrylate;
(c) 10.0-25.0% by weight of di(trimethylolpropane) tetraacrylate;
(d) 5.0-10.0% by weight of pentaerythritol tetra(3-mercaptopropionate); and
(e) 0.0-1.0% by weight of polyether-modified polysiloxane.

6. The artificial nail and curing composition set of claim 2 further comprising a top coat composition for application to the artificial nail tip, the top coat composition consisting essentially of:
(a) 35.0-50.0% by weight of polyurethane acrylate oligomers;
(b) 15.0-30.0% by weight of 2-hydroxyethyl methacrylate;
(c) 10.0-25.0% by weight of di(trimethylolpropane) tetraacrylate;
(d) 5.0-10.0% by weight of pentaerythritol tetra(3-mercaptopropionate); and
(e) 0.0-1.0% by weight of polyether-modified polysiloxane.

7. The artificial nail and curing composition set of claim 3 further comprising a top coat composition for application to the artificial nail tip, the top coat composition consisting essentially of:
(a) 35.0-50.0% by weight of polyurethane acrylate oligomers;
(b) 15.0-30.0% by weight of 2-hydroxyethyl methacrylate;
(c) 10.0-25.0% by weight of di(trimethylolpropane) tetraacrylate;
(d) 5.0-10.0% by weight of pentaerythritol tetra(3-mercaptopropionate); and
(e) 0.0-1.0% by weight of polyether-modified polysiloxane;
wherein said top coat composition has a boiling point of 212° F., a flash point of 96° F., and a specific gravity of 1.14.

8. The artificial nail and curing composition set of claim 4 further comprising a top coat composition for application to the artificial nail tip, the top coat composition consisting essentially of:
(a) 35.0-50.0% by weight of polyurethane acrylate oligomers;
(b) 15.0-30.0% by weight of 2-hydroxyethyl methacrylate;
(c) 10.0-25.0% by weight of di(trimethylolpropane) tetraacrylate;
(d) 5.0-10.0% by weight of pentaerythritol tetra(3-mercaptopropionate); and
(e) 0.0-1.0% by weight of polyether-modified polysiloxane;
wherein said top coat composition has a boiling point of 212° F., a flash point of 96° F., and a specific gravity of 1.14.

9. The artificial nail and curing composition set of claim 7 further comprising a pH bonder and a non-acidic gel primer, wherein the pH bonder is applied to the surface of the fingernail to form a pH bonder layer, the non-acidic gel primer is applied to the pH bonder layer to form a primer layer, and the adhesive composition is applied to the primer layer.

10. The artificial nail and curing composition set of claim 8 further comprising a pH bonder and a non-acidic gel primer, wherein the pH bonder is applied to the surface of the fingernail to form a pH bonder layer, the non-acidic gel primer is applied to the pH bonder layer to form a primer layer, and the adhesive composition is applied to the primer layer.

* * * * *